United States Patent [19]

Cila et al.

[11] Patent Number: 5,121,204
[45] Date of Patent: Jun. 9, 1992

[54] APPARATUS FOR SCRAMBLING SIDE PANEL INFORMATION OF A WIDE ASPECT RATIO IMAGE SIGNAL

[75] Inventors: Benjamin J. Cila, Lawrenceville; Joshua L. Koslov, East Windsor; Robert N. Hurst, Jr., Hopewell; Charles B. Dietrich, Kingston, all of N.J.

[73] Assignee: General Electric Company, Princeton, N.J.

[21] Appl. No.: 604,536

[22] Filed: Oct. 29, 1990

[51] Int. Cl.⁵ .................................. H04N 7/04
[52] U.S. Cl. .......................... 358/141; 358/12
[58] Field of Search .............. 358/141, 142, 12

[56] References Cited

U.S. PATENT DOCUMENTS

| | | | |
|---|---|---|---|
| 4,663,659 | 5/1987 | Blatter | 380/14 |
| 4,855,811 | 8/1989 | Isnardi | 358/12 |
| 4,959,717 | 9/1990 | Faroudja | 358/147 |
| 5,010,405 | 4/1991 | Schreiber et al. | 358/12 X |

Primary Examiner—Victor R. Kostak
Attorney, Agent, or Firm—Joseph S. Tripoli; Eric P. Herrmann; Ronald H. Kurdyla

[57] ABSTRACT

In a widescreen television signal processing system, side panel video information is scrambled prior to modulating an auxiliary subcarrier which is ultimately combined with main panel video information. In a preferred embodiment the scrambling process involves rotation of image line information about a pseudorandomly chosen cut-point.

22 Claims, 8 Drawing Sheets

APPARATUS FOR SCRAMBLING SIDE PANEL INFORMATION OF A WIDE ASPECT RATIO IMAGE SIGNAL

FIELD OF THE INVENTION

This invention concerns apparatus for encoding auxiliary information in a television signal. In particular, this invention concerns apparatus for encoding side panel information in a compatible widescreen television signal.

A conventional television system, such as a system in accordance with the NTSC broadcast standard adopted in the United States and elsewhere, processes a television signal representative of an image with a 4:3 aspect ratio (the ratio of the width to the height of a displayed image). Recently, there has been interest in using higher aspect ratio images for television systems, such as 5:3, 16:9 and 2:1, since such higher aspect ratios more nearly approximate or equal the aspect ratio of the human eye compared to the 4:3 aspect ratio of a standard television display. An advanced television system for producing 5:3 aspect ratio images is described, for example, in U.S. Pat. No. 4,855,811—Isnardi. In this system side panel image information is encoded by time compressing low frequency side panel information into horizontal overscan regions, and high frequency side panel information is encoded modulating a phase controlled auxiliary subcarrier with time expanded side panel luminance and chrominance information. The encoded signal is intended to be compatible with a standard NTSC signal processing system so as to produce a standard 4×3 aspect ratio display, and to produce a widescreen 5×3 aspect ratio display when processed by widescreen television receiver.

It is herein recognized that the modulated auxiliary subcarrier can produce objectionable interference in a standard television signal display system even if the modulated auxiliary subcarrier is attenuated in amplitude. Examples of such interference which can occur include chrominance dot patterns and phantom side panel images appearing across a standard 4×3 image display. The disclosed apparatus according to the present invention is directed to substantially eliminating such interference.

SUMMARY OF THE INVENTION

In accordance with the principles of the present invention, the modulated auxiliary subcarrier signal is decorrelated, or scrambled. This can be accomplished by scrambling the modulated auxiliary subcarrier signal, or by scrambling the baseband components which modulate the auxiliary subcarrier. In an illustrated preferred embodiment of the invention, the baseband components are scrambled prior to modulation and prior to time expansion by a process of rotating of image line information about a pseudorandomly chosen cut-point in the encoder.

DETAILED DESCRIPTION OF THE DRAWING

Figure 1A:
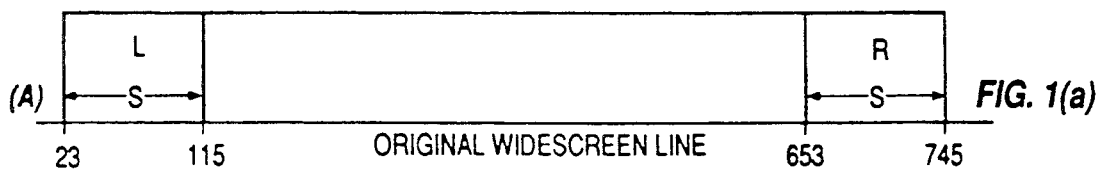
FIGS. 1(a) through 1(f) and 3(a) through 3(f) depict signal amplitude versus time characteristics at an encoder and decoder, respectively, which are helpful in understanding the operation of apparatus according to the present invention.
Figure 1B:
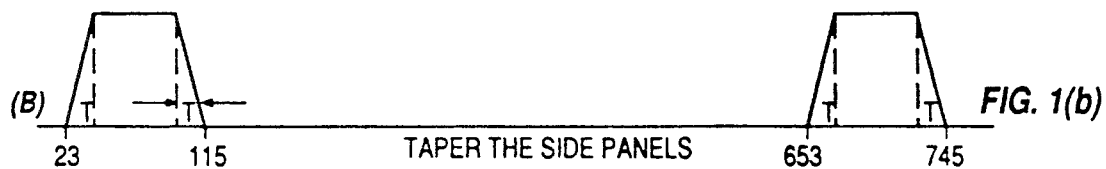
Figure 1C:
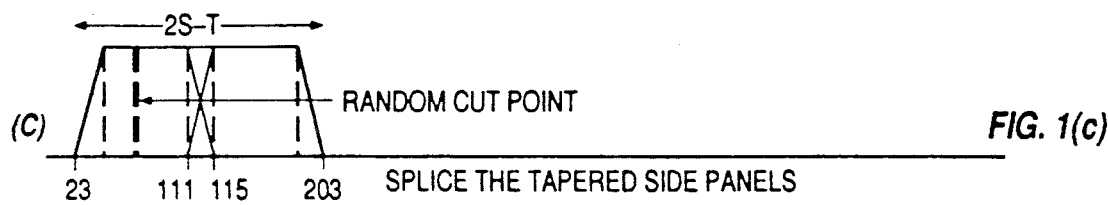
Figure 1D:
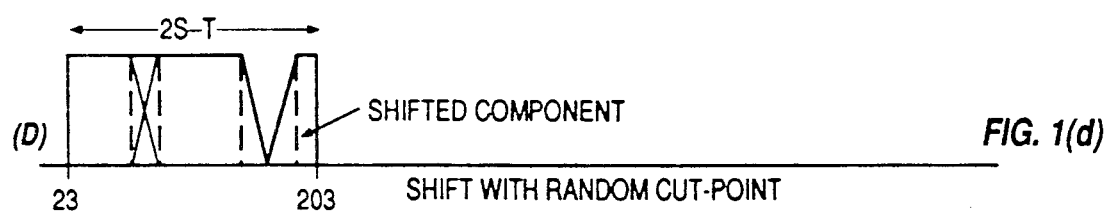
Figure 1E:
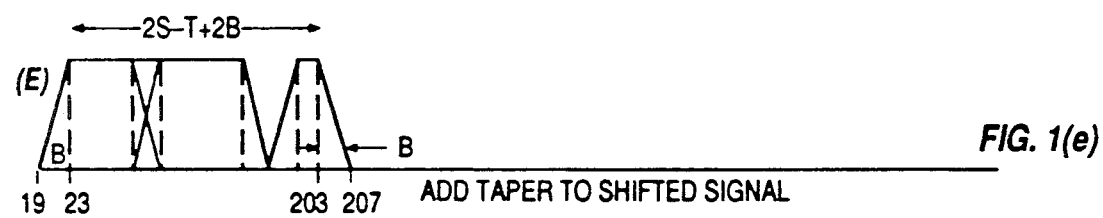
Figure 1F:
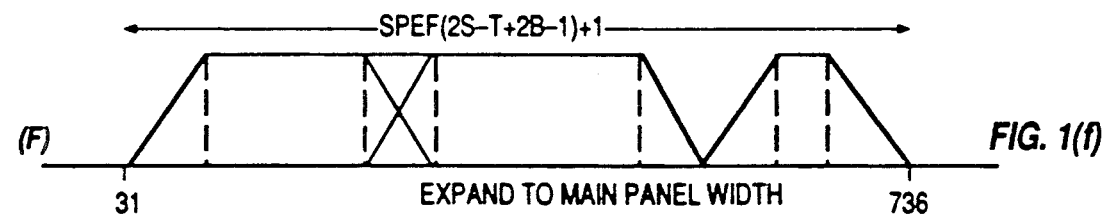

FIG. 1 illustrates the process by which side panel information of a widescreen television signal is scrambled before modulating an auxiliary subcarrier prior to being transmitted. Waveform (A) of FIG. 1 depicts left (L) and right (R) side panel components of a widescreen television signal. In this example the left and right sidepanel components encompass pixels 23-115 and 653-745, respectively, for each horizontal line. Each side panel component exhibits a width S of 93 pixels.

As shown in waveform (B), the side panel edges are tapered over regions T which are each five pixels wide. The tapered left and right side panel components are then spliced together as shown in waveform (C), with the spliced portion occupying the region from pixel 111 to pixel 115. The spliced side panel component of waveform (C) is then circularly shifted, or rotated, about a pseudorandom cut point, as illustrated by waveform (C), to produce a circularly shifted sidepanel component as shown by waveform (D). Apparatus for producing the circular shifting operation will be discussed subsequently.

In the circular shifting operation, the information to the left of the cut point, i.e., the information between pixel 23 and the cut point inclusive, is "cut" from the left portion of the spliced sidepanel component and "pasted" to the right portion of the spliced side panel component, as shown by waveform (D). This cut and pasted component is identified as the "shifted component" in waveform (D), although it should be recognized that the entire spliced sidepanel component is shifted (to the left in this example) as a result of the cut and paste operation. The extreme left and right edges of the shifted component are tapered to produce a desired rise and fall time response insofar as the shifted component is intended to be transmitted over a limited bandwidth channel. These tapers are illustrated as 5 pixel wide regions B in waveform (E). Although the tapers are illustrated as being in the interest of simplicity, they can be nonlinear as well. This linear component is then time expanded by a predetermined side panel expansion factor (SPEF) as shown by waveform (F) so that it exhibits the width of the main (center) panel component of the widescreen signal. The circular shifting is advantageously performed prior to time expansion to reduce the number of pixels involved in the shifting process, which conserves memory. The time expanded side panel component depicted by waveform (F) modulates a field phase controlled auxiliary subcarrier which is combined with the main panel component of the widescreen signal for transmission.

The process by which the scrambled signal component is unscrambled at a receiver is illustrated by waveforms (A) through (E) of FIG. 3. The unscrambling process is essentially the reverse of the scrambling process. Waveform (A) of FIG. 3 shows the time expanded side panel component which has been scrambled by the circular shifting. or line rotation. process described previously. The scrambled component is time compressed to its original form as shown by waveform (B) of FIG. 3. The tapers which had been added to the extreme left and right edges of the signal are then discarded as illustrated by waveform (C). An inverse circular shift is performed as indicated by waveform (D), wherein the signal portion which had been shifted during the scrambling process is "cut" and "pasted" into its original position along the left side of the spliced side panel component. In this regard it is noted that the pseudorandom cut point is known to the decoder as will be explained subsequently.

The splicing region encompassing pixels 111–115 is then discarded and the spliced left and right side panel components are separated and placed in their original positions in the horizontal image line, as illustrated by waveform (E). The repositioned left and right side panel components are spliced to a decoded center panel component to produce a widescreen waveform (F) with a viewable image portion as indicated.

Figure 2:
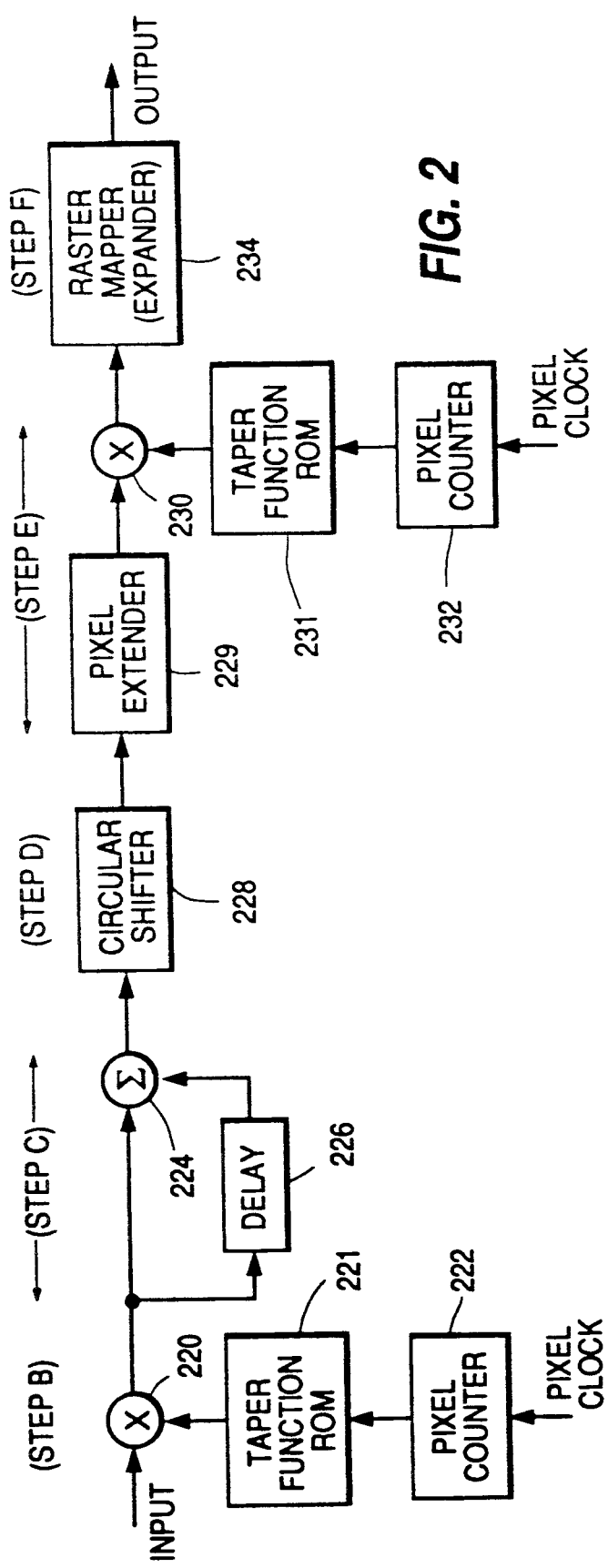
FIGS. 2 and 4 respectively show encoder and decoder apparatus for implementing the invention.

FIG. 2 is a block diagram of encoder apparatus for producing a scrambled signal as illustrated by FIG. 1. In FIG. 2 steps labeled (B) through (F) identify elements associated with producing waveforms (B) through (F) in FIG. 1.

The side panel input signal of waveform (A) is multiplied in a unit 220 with an output signal from a ROM 221, which responds to a pixel counter 222 for producing the taper over taper regions T. ROM 221 is programmed to produce output values over regions T such that when these values are multiplied with corresponding input pixel values, the desired taper results. The tapered side panel components are spliced by means of a unit 224 which combines the tapered left side panel component with the tapered right side panel component after being appropriately delayed by a unit 226. The spliced side panel component is circularly shifted by a unit 228 and subjected to a pixel extending process by a unit 229. In practice, the pixel extending operation can be accomplished automatically as part of the circular shifting operation, as will be discussed. The extreme left and right edges of the circularly shifted signal from units 228 and 229 are tapered by multiplying the shifted signal in a unit 230 with an output signal from a ROM 231, which responds to a pixel counter 232. Like ROM 221, ROM 231 is programmed to produce output values for predetermined pixel numbers such that when these values are multiplied with the corresponding pixel number values of the input signal from unit 229 the desired edge taper results. A raster mapper 234 time expands the output signal from multiplier 230 to produce a signal represented by waveform (F) in FIG. 1.

Figure 4:
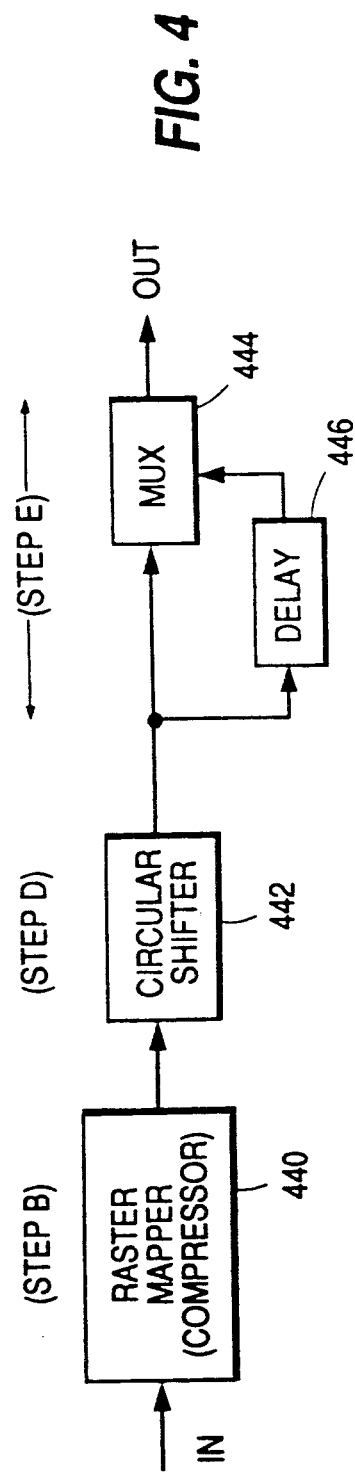
Figure 3A:
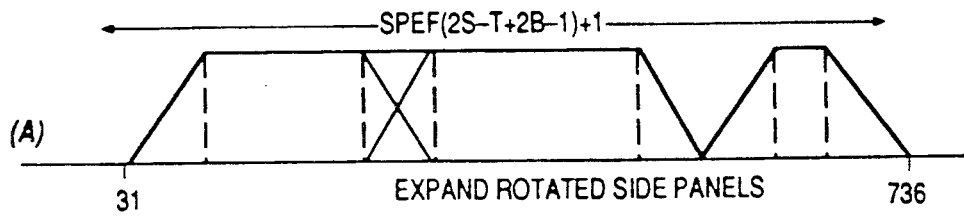
Figure 3B:
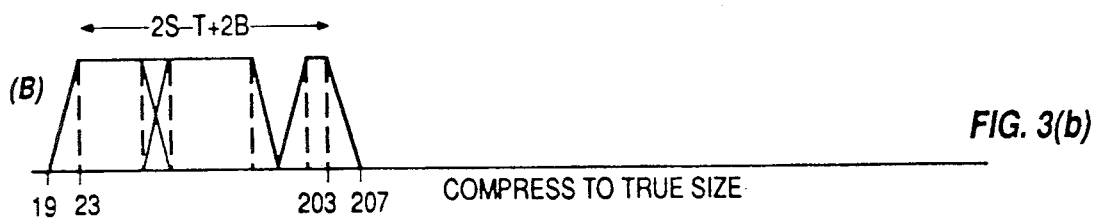
Figure 3C:
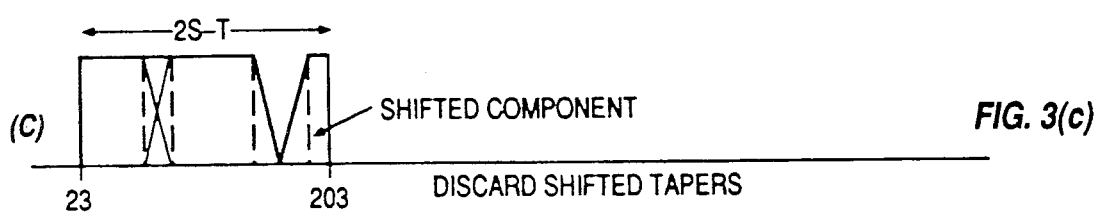
Figure 3D:
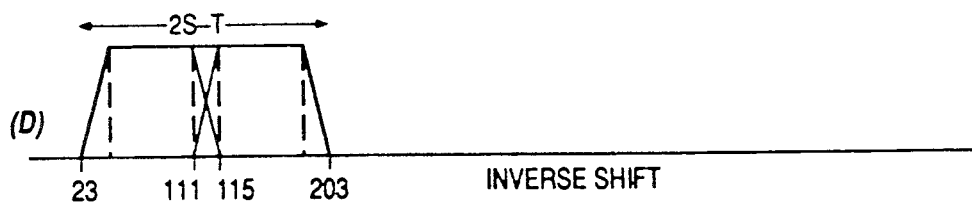
Figure 3E:
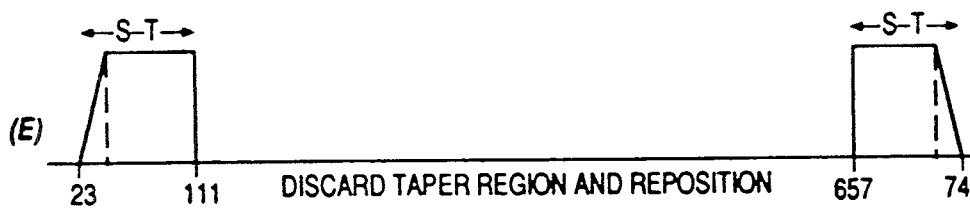
Figure 3F:
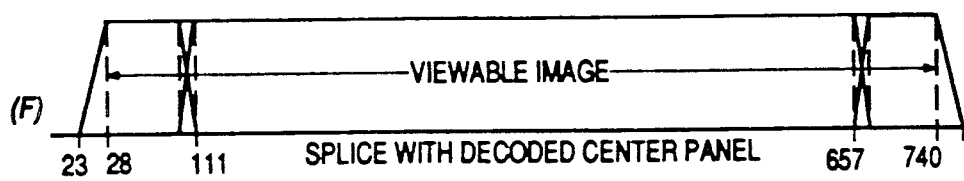

FIG. 4 illustrates apparatus for descrambling the scrambled side panel signal as illustrated by the waveforms of FIG. 3. An input signal of the form depicted by waveform (A) of FIG. 3 is time compressed to its original size by a raster mapper 440 before being unscrambled by a circular shifter 442. Unit 442 performs the inverse of the operation performed by unit 228 in FIG. 2, resulting in waveform (D) of FIG. 3. The spliced side panel signal from the output of circular shifter 442 is separated into its constituent left and right side panel components by means of a time multiplexer (MUX) 444 together with a time delay element 446, yielding an output signal with left and right side panel components exhibiting their original temporal positions. To accomplish this unit 446 delays the spliced signal from shifter 442. MUX 444 then selects the left side panel component of the undelayed signal and places it in its original time slot in a horizontal image line. Similarly, MUX 444 selects the right side panel component of the delayed signal from unit 446 and places it in its original time slot in the horizontal image line.

Figure 5:
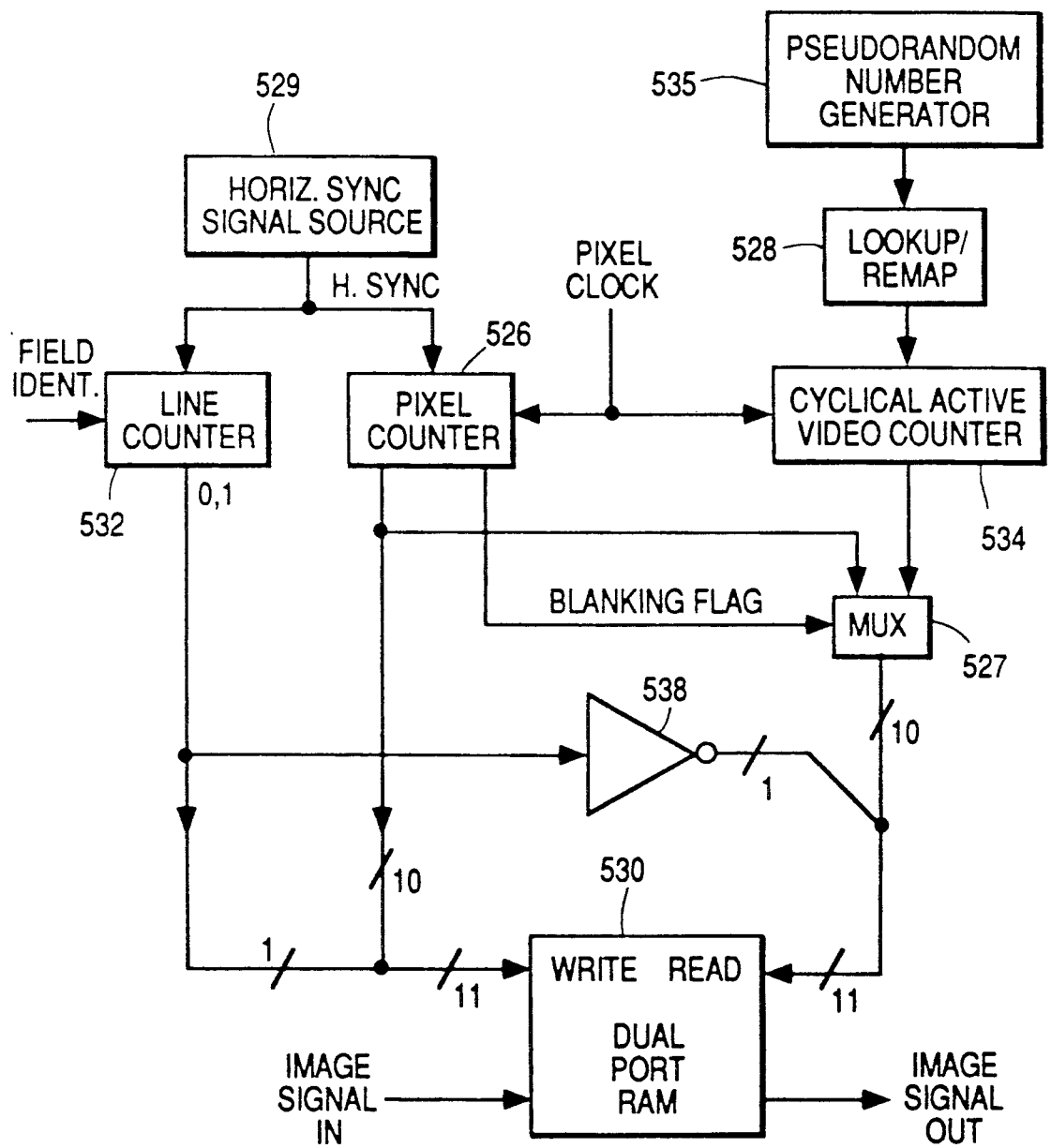
FIG. 5 shows details of apparatus for performing line rotation around a pseudorandomly determined point.

Apparatus for implementing the circular shifting operation performed by transmitter unit 228 of FIG. 2 and receiver unit 442 of FIG. 4 is shown in FIG. 5. The transmitter and receiver units are similar except with respect to the configuration of a LOOKUP/REMAP unit 528 as will be discussed. A dual port random access memory (RAM) 530 contains two horizontal image lines of storage capacity. While one line of an input image signal is being written into one half of the unit 530 memory at a rate determined by a signal applied to a WRITE input of unit 530, the previous video line is being read out of the other half of the unit 530 memory at a rate determined by a signal applied to the READ input of unit 530. An odd/even line counter 532 provides a control signal which is applied directly to the WRITE input of RAM 530 via an inverter 538. Counter 532 is initialized at the beginning of image fields by a field identification pulse FIELD IDENT and controls which half of the RAM 530 memory (i.e., which memory page) is being used for read or write purposes for each video line. Inverter 538 ensures that the read and write functions operate on different memory pages of RAM 530. The output of counter 532 represents the most significant bit (MSB) of the WRITE address input to RAM 530, and its complement at the output of inverter 538 is the MSB of the READ address. Inverter 538 is switched at the horizontal line rate to cause a toggle between the memory read and memory write functions of RAM 530. Thus, while new data is being written into one-half of the RAM 530 memory, old shifted data is being read out of the other half of the RAM 530 memory.

The WRITE input of RAM 530 is controlled by the output of a pixel counter 526 which is initialized at the beginning of each horizontal image line by a horizontal synchronizing pulse H. SYNC from a source 529. The H. SYNC pulse is also applied to counter 532 for synchronizing its operation with that of pixel counter 526. In this example the video signal being processed is in interlaced form such that each image frame comprises two image fields, with odd fields containing odd numbered image lines and even fields containing even numbered lines. The WRITE address port of RAM 530 also receives a line identifier control signal from counter 532. The output of counter 532 changes state (0, 1) from one horizontal image line to the next. Counter 532 is toggled to change its output state at the start of every line in response to the H. SYNC signal, and also in response to field identifier signal FIELD IDENT which indicates the presence of an odd or even image field as known. The field identifier signal initializes the state of counter 532 (e.g., at a zero count) at the beginning of each field. With identical signals applied to the WRITE and READ address ports of RAM 530, the output signal from RAM 530 corresponds to its input signal, i.e., circular shifting is not provided.

The signal applied to the READ address port of RAM 530 establishes the circular shifting operation in the scrambling mode. In the scrambling mode, the random cut-point (shown in waveform C of FIG. 1) is determined by a pseudorandom number provided by a number generator 535. Generator 535 produces a deterministic sequence of numbers for a given initial value. The number from unit 535 and cut-point change every video line, as will be discussed in greater detail in connection with FIG. 6. The pseudorandom number from generator 535 is applied every line to look-up/re-mapping table 528, which determines an initial cut-point value to be loaded into a cylical active video counter 534 in accordance with the value of the pseudorandom number. Counter 534 operates over the range of active video pixel numbers which are subject to being circularly shifted, beginning with the initial value provided by unit 528.

An output signal from counter 534 and the pixel count output signal from pixel counter 526 are applied to a multiplexer 527. In this example it is desired to scramble (line rotate) only during the interval of each line which encompasses the spliced side panel component. Thus, a BLANKING FLAG derived from counter 526 is used to control the operation of MUX 527 so that MUX 527 passes the output signal from counter 534 to the READ address port of RAM 530 for circular shifting purposes only during the interval containing the spliced sidepanel component which is to be scrambled. During the remaining portion of each line interval the pixel count signal from pixel counter 526 is passed to RAM 530 as the READ address signal.

By decreasing the duration of the BLANKING FLAG signal, i.e., increasing the active video interval, cyclical counter 534 can produce a wider video interval which can be tapered at the extreme edges as illustrated by waveform (E) in FIG. 1. This operation of the circular shifting apparatus thus encompasses that of pixel extender 229 in FIG. 2.

The pseudorandom number generated by unit 535 represents a random cut-point value. This value is translated or "remapped" by unit 528 into a value corresponding to a pixel number within the range of pixel numbers encompassed by the spliced side panel component which is to be circularly shifted (waveform C, FIG. 1). Number generator 535 is capable of generating an "invalid" number which is outside this range of pixel numbers. To account for this possibility, unit 528 is programmed to translate an invalid number to a valid number within the range of desired pixel numbers. Cyclical counter 534 is arranged to count exclusively over the range of pixel numbers encompassed by the spliced side panel component which is subject to being circularly shifted. The output value from unit 528 initializes counter 534 at the cut-point value, so that counter 534 begins counting from the cut-point pixel location and completes a count cycle at the pixel location which immediately precedes the cut-point. Thus the pixel at the cut-point becomes the first pixel in time of the shifted signal. The pixel which immediately preceded the cut-point becomes the last pixel in time of the shifted signal. The look-up/remap unit in the unscrambling apparatus at the receiver differs from the corresponding unit in the transmitter scrambling apparatus in that the receiver unit responds to an algorithm which accounts for the difference between the pixel number at the cut-point, and the last pixel number in the range of pixel numbers of interest encompassed by the spliced side panel component. The following simple example will be helpful in this regard.

Assume the range of pixel numbers of interest begins at zero and ends at 100. A cut-point at pixel number 25 produces a difference of 75, i.e., end number 100 minus cut-point number 25. A cyclical counter in an unscrambling unit at a receiver, i.e., corresponding to unit 534, is programmed to begin counting at a pixel location which is offset from beginning pixel zero by the amount of the difference described above. Thus in this example the receiver cyclical counter will begin counting at pixel location 75, and after a full 100-count cycle will stop counting at pixel location 74. This counting sequence will result in pixels being output sequentially in the unscrambled sequence as was the case before the shifting operation at the encoder.

If pseudorandom generator 535 at the encoder produces an invalid number, e.g., 125 which is outside the 0 to 100 range of valid pixel numbers, unit 258 will re-map this invalid number to a valid number, e.g., 25. Counter 534 will count from 25 to 100, then from 0 to 24. The first pixel is now at location 25. The pseudorandom number generator at the receiver outputs the same deterministic number, e.g., 125, at the same particular line, since the encoder and decoder number generators are reset after the same predetermined number of fields. At the receiver, the number 125 is remapped to the first pixel location as determined by its algorithm, in this case location 75. The cyclical counter at the receiver counts from 75 (the first pixel) to 100, then from 0 to 74 (the last pixel), resulting in pixels being output in the unscrambled sequence.

Figure 6:
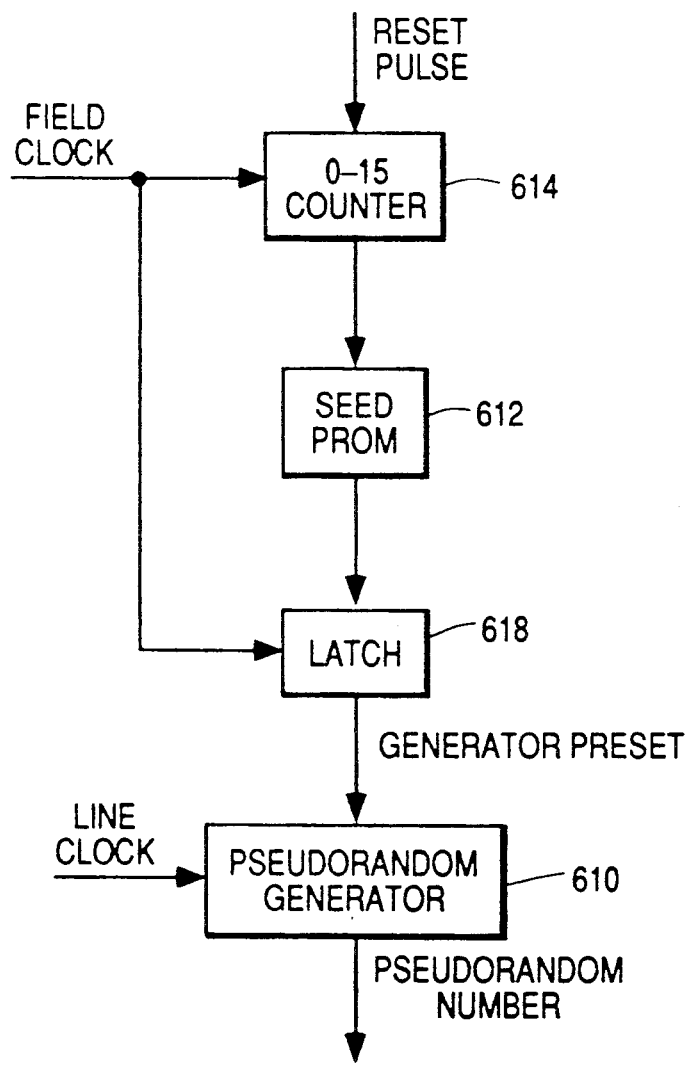
FIG. 6 shows details of a pseudorandom number generator associated with the apparatus of FIG. 5.

FIG. 6 illustrates apparatus associated with pseudorandom number generator 535 of FIG. 5. Pseudorandom generator 610 is a well known circuit which typically includes a shift register having a plurality of feedback taps which are exclusive—ORed with a logic gate, the output of which is fed back to the input of the shift register. The length of the pseudorandom pattern produced by the shift register before repetition occurs is determined by the length of the shift register and the location of the feedback taps. Generator 610 is clocked every horizontal line by a LINE CLOCK signal, and produces a new output pattern for every line.

Pseudorandom generator 610 is preset to a particular initial state at the beginning of each field in response to a PRESET signal. The PRESET signal exhibits a value determined by an output signal from a seed PROM 612, which is conveyed to the preset input of generator 610 via a latch 618. Seed PROM 612 responds to an output signal from a field counter 614 which provides a 0-15 count so that the scrambling pattern repeats every sixteen field intervals in this example. Counter 614 and latch 618 are clocked by a field rate FIELD CLOCK signal. In systems which intraframe process video information, the two fields which comprise an intraframe information pair should use the same scrambling pattern. In such case, the contents of the seed PROM should repeat the same initial seed value for each field of an intraframe pair of fields. For example, the seed PROM would be arranged so that a first seed value would be associated with seed PROM addresses 0 and 1 for the first two fields, a second seed value would be associated with PROM addresses 2 and 3 for the next two fields, a third seed value would be associated with PROM addresses 4 and 5, and so forth. Field counter 614 is reset by a RESET pulse at the beginning of each scrambling interval so that the scrambling and descrambling apparatus at the transmitter and receiver track each other. In this example, the scrambling interval encompasses sixteen fields although other scrambling intervals can be chosen. The RESET signal can be conveyed in various ways, such as in a prescribed portion of the vertical blanking interval.

More specifically, at the beginning of a scrambling sequence, the RESET PULSE resets field counter 614 to a zero count, and seed PROM 612 produces an initial value which is latched into pseudorandom generator 610 as the PRESET signal in response to a FIELD CLOCK pulse for the initial field. The initial value from seed PROM 612 initializes the state of generator 610 at a non-zero value. Generator 610 is clocked at a horizontal line rate by the LINE CLOCK for producing the pseudorandom number sequence. PROM 612 produces the same seed number for the next field, but produces a different seed number for the following two fields. Thus, the seed values from PROM 612 change after every two fields, as mentioned previously. A television receiver includes pseudorandom number generator apparatus similar to that shown in FIG. 6 for unscrambling the video signal with respect to the cut-point determined by the pseudorandom number. The pseudorandom number generators at the transmitter and receiver will predictably produce the same sequence of numbers from a given initial number value as determined by the seed value. The seed PROMs at the transmitter and receiver are programmed similarly.

Figure 7:
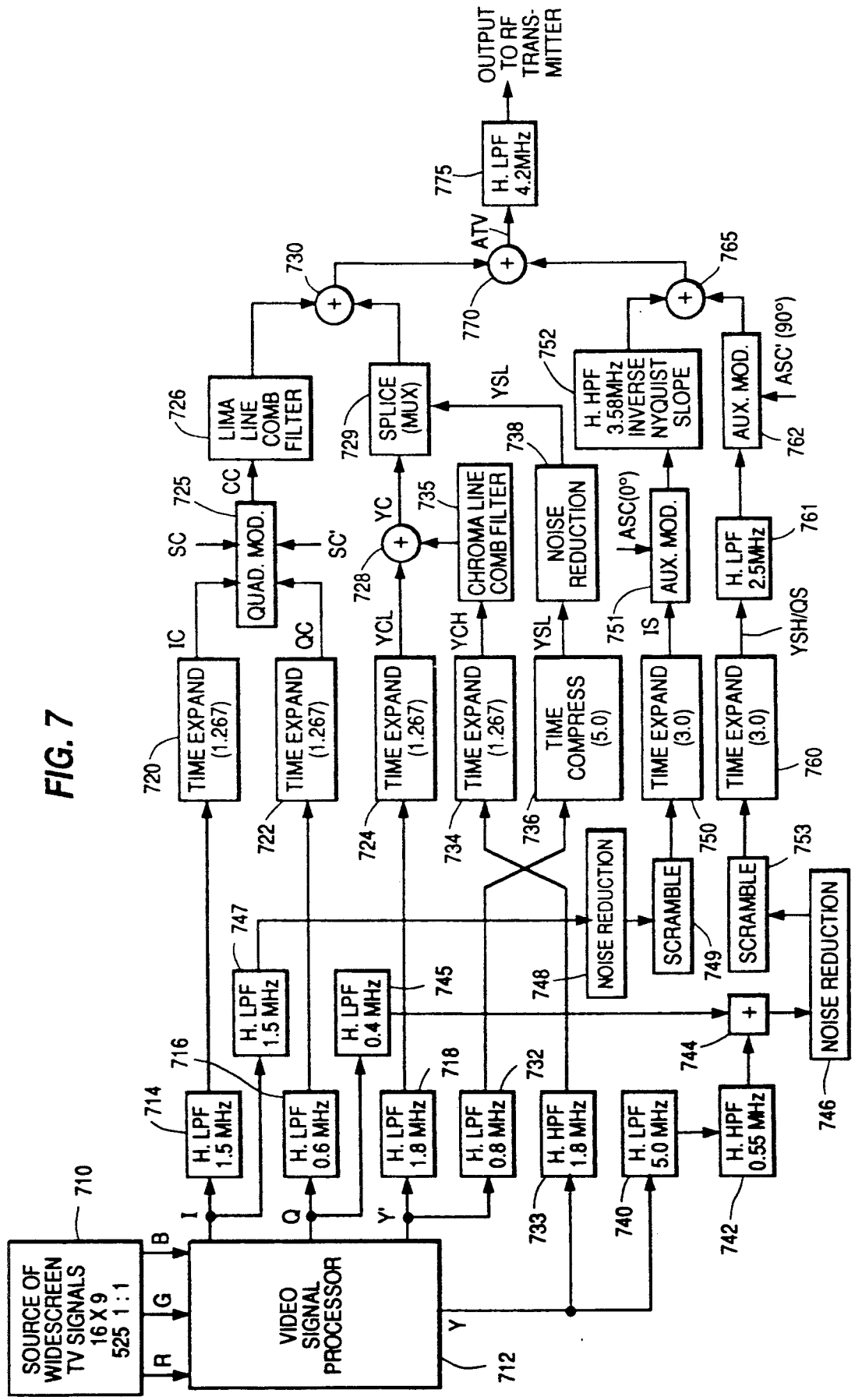
FIG. 7 is a block diagram of a compatible widescreen television signal encoder including apparatus according to the present invention.

In the NTSC compatible widescreen transmitter/encoder of FIG. 7, a widescreen television signal source 710, such as a color television camera, provides a 16×9 wide aspect ratio 1:1 progressively scanned (non-interlaced) television signal with color components R, G and B. These signals are processed by a video signal processor 712 to provide luminance output signals Y, Y' and color difference output signals I and Q. Processor 712 includes circuits for translating the R, G, B input signals to I, Q, Y format, vertical-temporal filters for pre-filtering each of the I, Q, Y signals, and progressive scan to interlaced scan converters for each of the I, Q, Y signals. Output signals I, Q and Y from processor 712 are 262 line progressive scan signals. An output signal Y' is a 525 line interlaced luminance signal.

Encoding of the main (i.e., "center") panel information will be discussed first. Color difference signals I, Q and luminance signal Y' from unit 712 are respectively filtered by filters 714, 716 and 718 before being time expanded by units 720, 722 and 724, respectively. Units 720, 722 and 724 exhibit a time expansion factor of 1.267 and operate only on the center (main) panel portion of the I, Q, Y' signals from filters 714, 716 and 718. Thus time expanders 720 and 722 respectively provide output center panel color difference signals IC and QC. Time expander 724 provides an output luminance center panel low frequency signal YCL. Signals IC and QC quadrature modulate 3.58 MHz quadrature phased subcarriers SC and SC' in a modulator 725 to produce a modulated center panel chrominance signal CC. This signal is processed by a luminance line comb filter 726 to remove luminance information before being applied to a center panel chrominance input of an adder 730.

The center panel luminance signal input to adder 730 is developed as follows. The Y luminance signal from processor 712 is high pass filtered by a unit 733 and time expanded by a unit 734, which operates only during the center panel interval, to develop a center panel high frequency luminance signal YCH. This signal is processed by a chrominance line comb filter 735 to remove chrominance information before being combined with center panel low frequency luminance signal YCL in adder 728 to produce a center panel luminance signal YC.

Expanded center panel luminance signal YC is spliced to compressed side panel low frequency luminance information YSL by means of a multiplexer 729. Briefly, as discussed in detail in U.S. Pat. No. 4,855,811—Isnardi, signal YSL constitutes time compressed low frequency left and right side panel luminance information which is placed in left and right horizontal overscan regions of the center panel signal by means of multiplexer 729. Signal YSL is obtained by filtering signal Y' from processor 172 by means of a 0.8 MHz horizontal low pass filter 732, then selectively time compressing the side panel portions of the filtered signal by means of a compressor 736 which operates only during the side panel intervals. Signal YSL from compressor 736 is processed by a noise reduction unit 738 for improving the signal-to-noise characteristic of signal YSL before being applied to splicer 729. The output of multiplexer/splicer 729 is applied to the luminance input of center panel signal combiner 730. Noise reduction unit 738, as well as noise reduction units 746 and 748, are amplitude compansion units having similar complementary counterpart units with inverse operating characteristics at a receiver.

High frequency side panel information is processed as follows. The "I" color difference component from processor 712 is filtered by a 1.5 MHz low pass filter 747 to produce a wideband I signal, and is processed by noise reduction unit 48. The output signal from unit 748 can be processed by a scrambling network 749 of the type shown in FIG. 2 before being time expanded by unit 750. The output signal from unit 748 is time expanded during side panel intervals by a time expander 750 to produce wideband side panel color difference component IS. This signal is applied to an auxiliary modulator 751 for amplitude modulating and auxiliary subcarrier ASC with a nominal 0° phase. Subcarrier ASC exhibits a frequency of 3.58 MHz, the frequency of the standard chrominance subcarrier, but exhibits a phase which inverts from field-to-field unlike the standard chrominance subcarrier. Specifically, the phase of signal ASC inverts every 262 horizontal lines (262H).

The modulated signal from unit 751 is applied to a 3.58 MHz horizontal high pass filter 752 having an inverse Nyquist slope. Filter 752 mirrors a filter at a receiver having a Nyquist slope to achieve a desired amplitude response at a receiver demodulator. Specifically, the cascade of inverse Nyquist slope filter 752 at the encoder with a complementary Nyquist slope filter at a receiver decoder produces a desired flat amplitude response for high frequency side panel luminance signal YSH when demodulated at the receiver. Such cascade of Nyquist slope filters also assures that modulated auxiliary subcarrier ASC exhibits symmetrical double sideband IS information so that proper quadrature demodulation is achieved at the decoder, i.e., so that signal IS maintains a desired phase characteristic and does not crosstalk into components YSH or QS.

Side panel high frequency luminance information and side panel color difference component "Q" are combined for processing. The Q output signal from processor 712 is conveyed via a 0.4 MHz horizontal low pass filter 745 to a combiner 744, where it is combined with signal Y from unit 712 after filtering by a 5.0 MHz horizontal low pass filter 740 and a 0.55 MHz horizontal high pass filter 742. The output signal from combiner 744 is processed by noise reduction unit 746 and afterwards time expanded by a unit 760. The output signal from unit 746 is processed by a scrambling network 753 of the type shown in FIG. 2 before being time expanded by unit 760. Expander unit 760 operates during the side panel intervals for producing combined side panel highs signal YSH/QS, i.e., side panel high frequency luminance information combined with side panel Q color difference information. Because time expander 760 is not ideal, low energy repeat spectra are generated above 2.5 MHz. Low pass filter 761 removes these repeat spectra and prevents them from cross-talking into the main (center) panel component after modulation.

Combined signal YSH/QS is coupled via a 2.5 MHz horizontal low pass filter 761 to an auxiliary modulator 762, which modulates an auxiliary 3.58 MHz subcarrier ASC' with the output signal from filter 761. Subcarrier ASC' is in phase quadrature with subcarrier ASC and exhibits a similar phase inversion from field to field. The output signal from modulator 762 and the output signal from filter 752 are combined by an adder 765. An adder 770 combines the output signals from adders 730 and 765 to produce a compatible widescreen advanced television signal ATV. This signal is low pass filtered by a 4.2 MHz filter 775 to restrict signal ATV to the standard NTSC channel bandwidth before being applied to an RF transmitter for broadcast.

The disclosed scrambling apparatus also can be inserted between the time translation and modulation units, i.e., between blocks 750 and 751 and between blocks 760 and 762 in FIG. 7. Alternatively, the scrambling apparatus can be inserted after each of modulator blocks 751 and 762 for scrambling the modulated auxiliary subcarrier, or a single scrambling unit can be used after combiner 765. Corresponding alternative locations are used for unscrambling units at the decoder, e.g., between units 842 and 846 and between units 854 and 856, or prior to auxiliary subcarrier demodulator 852 in FIG. 8.

Figure 8:
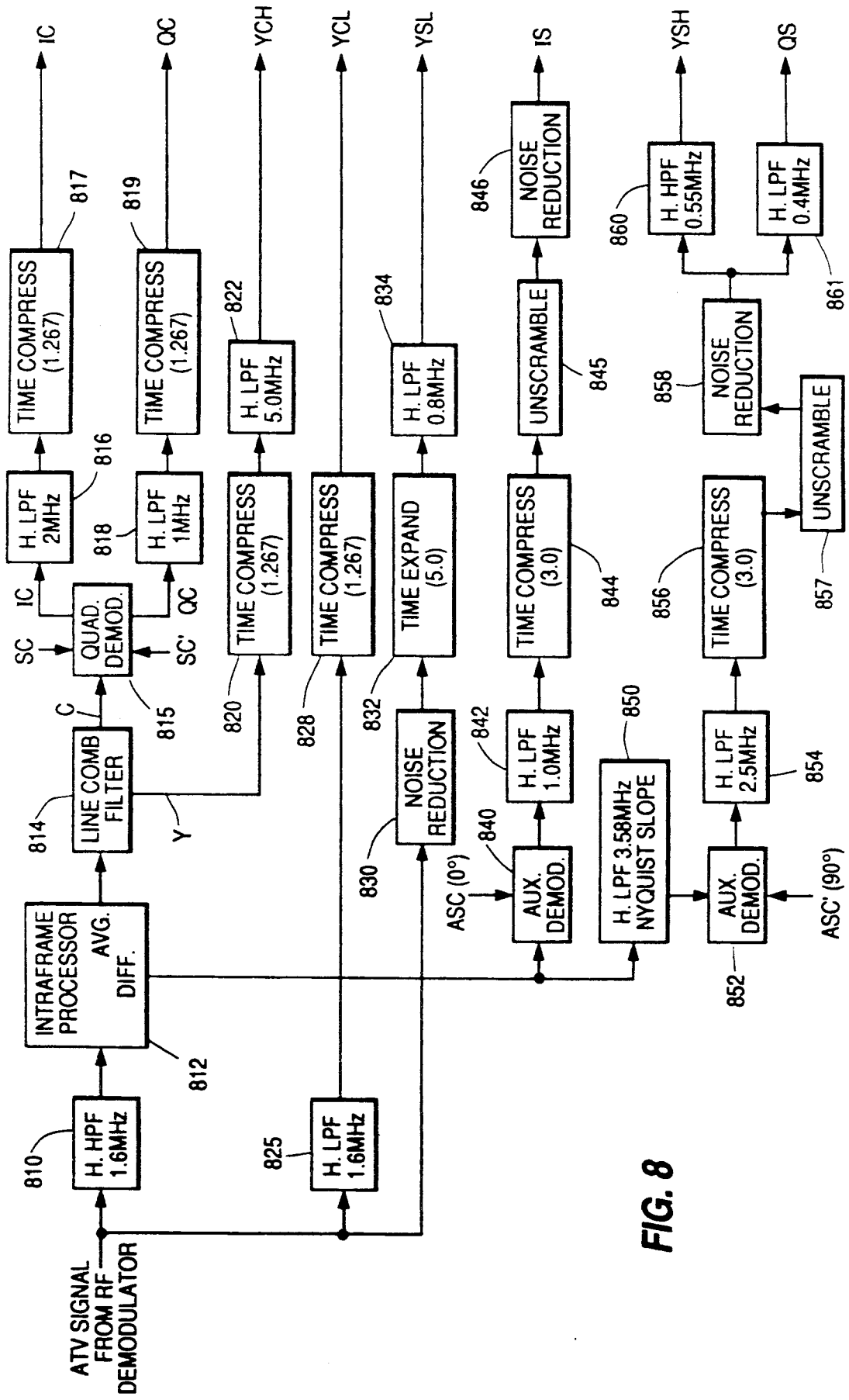
FIG. 8 is a block diagram of a compatible widescreen television signal decoder including apparatus according to the present invention.

FIG. 8 shows a portion of a widescreen television receiver including apparatus for decoding the widescreen ATV signal generated by the arrangement of FIG. 7. A received baseband encoded ATV signal (e.g., from an RF tuner and demodulator assembly not shown) is applied to a 1.6 MHz horizontal high pass filter 810, the output of which is applied to an intraframe processor 812. Processor 812 averages (additively combines) and differences (substractively combines) image lines 262H apart within frames above 1.6 MHz to recover high frequency main panel signal information at an output AVG. Modulated side panel high frequency information is provided at a differencing output DIFF of processor 812.

The main panel component from the AVG output of processor 812 is filtered by a horizontal line comb filter 814 to provide separated luminance (Y) and chrominance (C) output components. The separated main panel luminance component is time compressed by a unit 820, which operates only during the main panel interval, to restore separated main panel component Y to its original spatial relationship. The time compressed signal from unit 820 is then filtered by a 5.0 MHz horizontal low pass filter 8822 to develop main (center) panel luminance high frequency component YCH. The separated main panel chrominance information (C) is quadrature demodulated by a demodulator 815 responsive to quadrature phased reference signals SC and SC' having the frequency and phase characteristics of corresponding subcarrier signals provided at the encoder/transmitter. Demodulated center panel I and Q color difference components IC and QC are horizontally low pass filtered by filters 816 and 818 respectively before being time compressed by units 817 and 819. Time compression units 817 and 819 operate during the center panel intervals to restore the original spatial relationship of signals IC and QC.

The center panel low frequency luminance information is restored to its original form by means of filter 825 and time compressor 828. Horizontal low pass filter 825 passes frequencies of input signal ATV which are below about 1.6 MHz to time compressor 828, which operates during the center panel interval to restore low frequency center panel luminance information to its original spatial relationship, as signal YCL.

The input ATV signal is also applied to a noise reduction unit 830, which exhibits the complementary operating characteristics of unit 738 in the encoder of FIG. 7. A time expander 832 operates during the side panel intervals to restore the original spatial format of the side panel information which had been time compressed and placed in the horizontal overscan regions. The output signal from expander 832 is processed by a 0.8 MHz horizontal low pass filter 834 to provide low frequency side panel luminance signal YSL in its original spatial form.

To recover side panel I color difference component IS, the signal from the DIFF output of processor 812 is demodulated by an auxiliary demodulator 840 which responds to an auxiliary reference signal ASC having the same frequency and phase characteristics as subcarrier ASC developed at the encoder. The demodulated signal from unit 840 is filtered by a 1.0 MHz horizontal low pass filter 842, time compressed during side panel intervals by a unit 844 to restore the original spatial format of the signal component, and processed by a noise reduction unit 846 to produce side panel color I difference component IS. Noise reduction unit 846 and unit 746 at the encoder exhibit complementary operating characteristics. The output signal from time compressor 844 is processed by an unscrambling network 845 of the type shown in FIG. 4 before being processed by noise reduction unit 846.

To recover side panel components YSH and QS, the signal from the DIFF output of processor 812 is processed by a 3.58 MHz horizontal low pass Nyquist slope filter 850 before being demodulated by auxiliary demodulator 852. With regard to the use of Nyquist filter 850 it is noted that in this example component QS is a double sideband signal modulation component of auxiliary subcarrier ASC' occupying 3.38 MHz to 3.79 MHz, and component YSH is a (lower) single sideband modulation component of auxiliary subcarrier ASC' occupying 1.78 MHz to 3.25 MHz. Imparting a Nyquist slope to the higher energy double sideband region of the combined YSH/QS modulated signal (from 3.08 MHz to 4.08 MHz) reduces the effective energy of the double sideband region by one-half, so that a flat demodulation amplitude response results over the auxiliary subcarrier modulation frequencies. Demodulator 852 also responds to an auxiliary reference signal ASC' having the same frequency and phase characteristics as auxiliary subcarrier ASC' developed at the encoder. A demodulated output signal from demodulator 852 contains combined YSH and QS components and is filtered by a 2.5 MHz horizontal low pass filter 854.

The output signal from filter 854 is time compressed by a unit 856 which operates during side panel intervals to restore the original spatial relationship of the combined YSH/QS side panel information. The time compressed signal is processed by a noise reduction unit 858, which exhibits the complementary operating characteristics of unit 746 in the encoder system of FIG. 7. The output signal from time compressor 856 is processed by an unscrambling network 857 of the type shown in FIG. 4 before being processed by noise reduction unit 858. The output signal from noise reduction unit 858 is separated into the YSH and QS components by means of a 0.55 MHz horizontal high pass filter 860, and a 0.4 MHz horizontal low pass filter 861, respectively.

Figure 9:
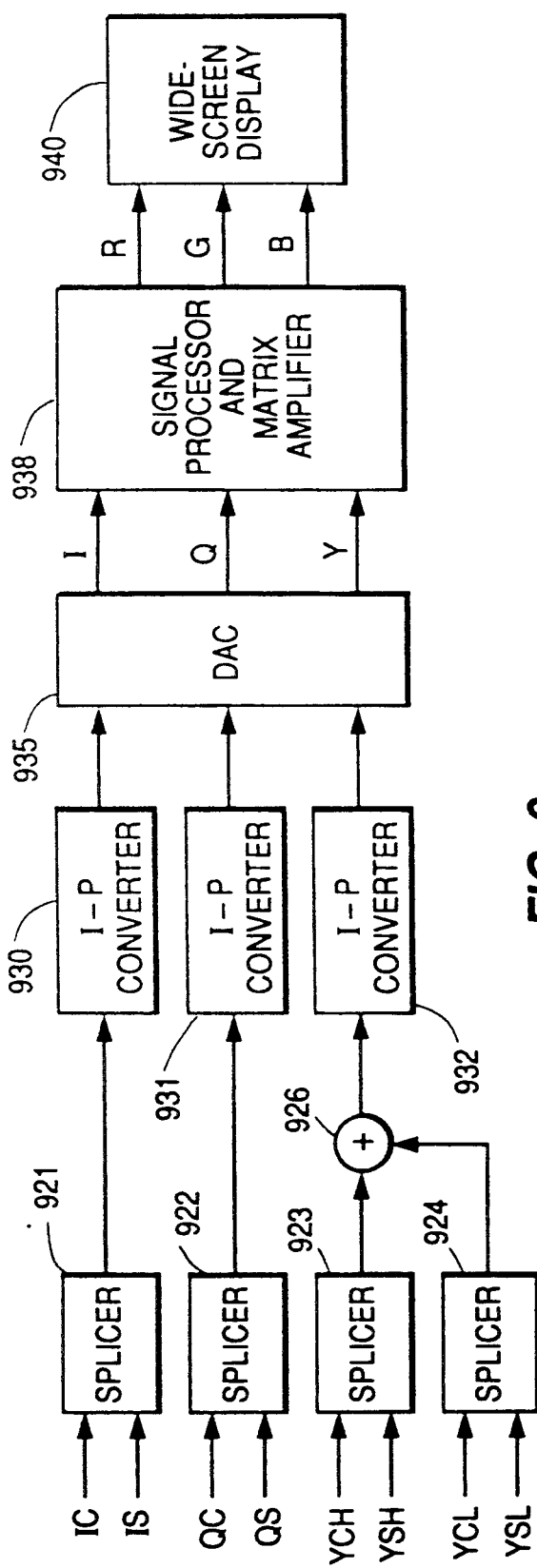
FIGS. 9 and 10 show additional details of the encoder and decoder apparatus depicted in FIGS. 7 and 8.

The output signals developed by the decoder apparatus of FIG. 8 are processed further as shown in FIG. 9. Signals IC and IS, QC and QS, YCH and YSH, and YCL and YSL are respectively spliced by splicers 921, 922, 923 and 924 respectively. Output signals from splicers 923 and 924 are combined by an adder 926 to provide a restored widescreen luminance signal with main panel and side panel information. The widescreen chrominance signals from splicers 921 and 922 and the widescreen luminance signal from adder 926 are converted from interlaced to progressive scan format by means of converters 930-932 before being converted to analog form via a digital-to-analog converter unit 935. Widescreen analog signals I, Q, Y are matrixed and processed by conventional video signal processing circuits in a network 938 to produce color image representative signals R, G and B suitable for display by a widescreen image reproducing device 940.

Figure 10:
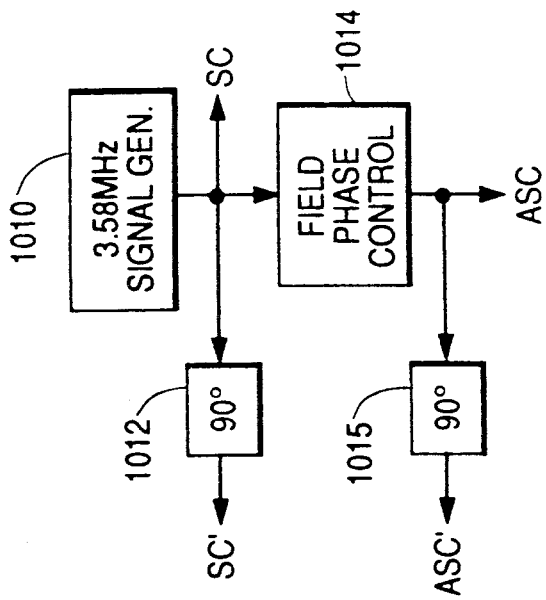

FIG. 10 depicts apparatus suitable for generating quadrature phased signals SC and SC', and quadrature phased auxiliary signals ASC and ASC'. A signal generator 1010 provides a 3.58 MHz sinusoidal signal SC at a nominal 0° phase. This signal is phase shifted 90° by a network 1012 to produce signal SC'. Signal ASC is derived from signal SC by means of a field phase control unit 1014, which produces auxiliary signal ASC with a phase that reverses from field to field relative to the phase of a standard chrominance subcarrier. A 90° phase shifter 1015 produces auxiliary signal ASC' in phase quadrature with auxiliary signal ASC.

What is claimed is:

1. In a system for processing a widescreen television signal representing an image constituted by main panel image information and side panel image information, and exhibiting a wide image aspect ratio produced by an image aspect ratio associated with said main panel image information together with an image aspect ratio associated with said side panel image information, apparatus comprising means for providing an auxiliary subcarrier signal;
means, including signal scrambling means, responsive to said side panel image information and to said auxiliary subcarrier signal for producing an output signal with scrambled side panel image information; and
means for combining said main panel information with said output signal.

2. Apparatus according to claim 1, wherein said side panel information is scrambled prior to modulating said auxiliary subcarrier.

3. Apparatus according to claim 1, wherein said auxiliary subcarrier is at a baseband frequency.

4. Apparatus according to claim 1, wherein said side panel information is combined right and left side panel information.

5. In a system for processing a widescreen television signal including main panel image information and side panel image information, apparatus comprising means for providing an auxiliary subcarrier signal;
means, including signal scrambling means, responsive to said side panel image information and to said auxiliary subcarrier signal for producing a scrambled modulated auxiliary subcarrier signal; and
means for combining said main panel information with said scrambled modulated auxiliary subcarrier signal; wherein
said side panel image information comprises right panel information and left panel information; and
said system further includes means for combining said right panel information and said left information to form a continuous combined signal prior to said scrambling means.

6. Apparatus according to claim 5 and further comprising means for time expanding a scrambled combined side panel output signal from said scrambling means.

7. In a system for processing a widescreen television signal including main panel image information and side panel image information, apparatus comprising means for providing an auxiliary subcarrier signal;
means, including signal scrambling means, responsive to said side panel image information and to said auxiliary subcarrier signal for producing a scrambled modulated auxiliary subcarrier signal; and
means for combining said main panel information with said scrambled modulated auxiliary subcarrier signal; wherein
said scrambling means comprises means for rotating image information about a cut point.

8. Apparatus according to claim 7, wherein said scrambling means rotates horizontal line information about a pseudorandomly chosen cut point.

9. In a system for processing a widescreen television signal including main panel image information and side panel image information, apparatus comprising means for providing an auxiliary subcarrier signal;
means, including signal scrambling means, responsive to said side panel image information and to said auxiliary subcarrier signal for producing a scrambled modulated auxiliary subcarrier signal;
means for combining said main panel information with said scrambled modulated auxiliary subcarrier signal; and
means for tapering the edges of said scrambled signal.

10. In a system for processing a widescreen television signal including main panel image information and side panel image information, apparatus comprising means for providing an auxiliary subcarrier signal;
means, including signal scrambling means, responsive to said side panel image information and to said auxiliary subcarrier signal for producing a scrambled modulated auxiliary subcarrier signal;
means for combining said main panel information with said scrambled modulated auxiliary subcarrier signal; and
means for intraframe processing video information in selected groups; wherein
said scrambling means processes information within a group similarly.

11. Apparatus according to claim 10 wherein said intraframe processing means processes groups containing image line pairs; and said scrambling means rotates line pairs within a given group about a similar cut point.

12. In a system for receiving a widescreen television signal including baseband main panel information combined with scrambled baseband side panel information, said widescreen television signal representing an image with a wide image aspect ratio produced by an image aspect ratio associated with said main panel information together with an image aspect ratio associated with said side panel image information, apparatus comprising means for separating said main panel information and said scrambled side panel information;

signal processing means including means for providing unscrambled side panel information; and means for combining said main panel information and said unscrambled side panel information.

13. In a system for receiving a widescreen television signal including baseband main panel information combined with scrambled baseband side panel information, apparatus comprising means for separating said main panel information and said scrambled side panel information;

signal processing means including means for providing unscrambled side panel information; and means for combining said main panel information and said unscrambled side panel information; wherein said side panel information comprises right and left side panel information components combined to form a continuous signal; and said system further includes means for separating said unscrambled side panel information into said left side panel information component and said right side panel information component.

14. Apparatus according to claim 13 and further including means for time compressing said side panel information before being processed by said signal processing means.

15. In a system for receiving a widescreen television signal including main panel information combined with a scrambled modulated auxiliary subcarrier signal modulated with side panel information, said widescreen television signal representing an image with a wide image aspect ratio produced by an image aspect ratio associated with said main panel information together with an image aspect ratio associated with said side panel image information, apparatus comprising means for separating said main panel information and said scrambled modulated auxiliary subcarrier signal;

signal processing means for deriving unscrambled side panel information from said scrambled modulated auxiliary subcarrier signal; and means for combining said main panel information and said unscrambled side panel information.

16. Apparatus according to claim 15, wherein said auxiliary subcarrier is modulated with scrambled side panel information; and said signal processing means includes means for demodulating said auxiliary subcarrier to recover said scrambled side panel information, and means for unscrambling said scrambled side panel information.

17. Apparatus according to claim 16 and further comprising means for time compressing said recovered scrambled side panel information; and means for applying said time compressed scrambled side panel information to said unscrambling means.

18. In a system for receiving a widescreen television signal including main panel information combined with a scrambled modulated auxiliary subcarrier signal modulated with side panel information, apparatus comprising means for separating said main panel information and said scrambled modulated auxiliary subcarrier signal;

signal processing means for deriving unscrambled side panel information from said scrambled modulated auxiliary subcarrier signal; and means for combining said main panel information and said unscrambled side panel information; wherein said signal processing means includes unscrambling means for rotating image information about a cut point to provide unscrambled side panel information.

19. Apparatus according to claim 18, wherein said unscrambling means rotates horizontal line information about a pseudorandomly chosen cut point.

20. In a system for receiving a widescreen television signal including main panel information combined with a scrambled modulated auxiliary subcarrier signal modulated with side panel information, apparatus comprising means for separating said main panel information and said scrambled modulated auxiliary subcarrier signal;

signal processing means for deriving unscrambled side panel information from said scrambled modulated auxiliary subcarrier signal;

means for combining said main panel information and said unscrambled side panel information; and means for intraframe processing video information in selected groups; wherein said signal processing means includes unscrambling means for processing information within a group similarly.

21. Apparatus according to claim 20, wherein said intraframe processing means processes groups containing image line pairs; and said unscrambling means rotates line pairs within a given group about a similar cut point.

22. In a system for receiving a widescreen television signal including main panel information combined with a scrambled modulated auxiliary subcarrier signal modulated with side panel information, apparatus comprising means for separating said main panel information and said scrambled modulated auxiliary subcarrier signal;

signal processing means for deriving unscrambled side panel information from said scrambled modulated auxiliary subcarrier signal; and means for combining said main panel information and said unscrambled side panel information; wherein said side panel information comprises right and left side panel information components combined to form a continuous signal; and said system further includes means for time compressing said side panel information before being processed by said signal processing means; and means for separating said unscrambled side panel information into said left side panel information component and said right side panel information component.

* * * * *